(12) United States Patent
Deshmukh et al.

(10) Patent No.: US 11,900,400 B2
(45) Date of Patent: *Feb. 13, 2024

(54) ENHANCED SURVEY INFORMATION SYNTHESIS

(71) Applicant: INTERNATIONAL BUSINESS MACHINES CORPORATION, Armonk, NY (US)

(72) Inventors: Abhijit Deshmukh, Pune (IN); Venkata Vara Prasad Karri, Visakhapatnam (IN); Saraswathi Sailaja Perumalla, Visakhapatnam (IN); Vamsi Vasireddy, Visakhapatnam (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 744 days.

This patent is subject to a terminal disclaimer.

(21) Appl. No.: 16/576,584

(22) Filed: Sep. 19, 2019

(65) Prior Publication Data

US 2021/0090103 A1 Mar. 25, 2021

(51) Int. Cl.
*G06Q 30/00* (2023.01)
*G06Q 30/0203* (2023.01)
*G06N 3/08* (2023.01)
*G06N 3/04* (2023.01)
*G06N 20/00* (2019.01)

(52) U.S. Cl.
CPC .......... *G06Q 30/0203* (2013.01); *G06N 3/04* (2013.01); *G06N 3/08* (2013.01); *G06N 20/00* (2019.01)

(58) Field of Classification Search
CPC ........ G06Q 30/0203; G06N 3/04; G06N 3/08; G06N 20/00; G06N 3/084
See application file for complete search history.

(56) References Cited

U.S. PATENT DOCUMENTS

| | | | |
|---|---|---|---|
| 9,285,973 B1 | 3/2016 | Gable | |
| 2002/0052774 A1* | 5/2002 | Parker | G06Q 30/02 705/7.32 |
| 2005/0195193 A1* | 9/2005 | Lehman | G06Q 10/105 345/440 |
| 2013/0110584 A1* | 5/2013 | Eggers | G06Q 10/06 705/7.32 |

(Continued)

OTHER PUBLICATIONS

Robling MR, Ingledew DK, Greene G, et al. Applying an extended theoretical framework for data collection mode to health services research. BMC Health Serv Res. 2010;10:180. Published Jun. 24, 2010. doi:10.1186/1472-6963-10-180 (Year: 2010).*

(Continued)

*Primary Examiner* — Sun M Li

(74) *Attorney, Agent, or Firm* — CUENOT, FORSYTHE & KIM, LLC

(57) ABSTRACT

Enhanced survey information synthesis can include performing a respondent assessment of a survey respondent based on respondent data obtained electronically from one or more electronic data sources. Survey responses provided by the survey respondent can be adjusted, the adjusting based on the respondent assessment. A revised survey can be generated, the revised survey comprising the survey responses adjusted based on the respondent assessment.

14 Claims, 6 Drawing Sheets

(56) References Cited

U.S. PATENT DOCUMENTS

| | | | | |
|---|---|---|---|---|
| 2013/0173343 | A1* | 7/2013 | Algranati | G06Q 30/0205 |
| | | | | 705/7.32 |
| 2014/0279130 | A1 | 9/2014 | Lau et al. | |
| 2014/0316856 | A1 | 10/2014 | Williams et al. | |
| 2015/0088608 | A1 | 3/2015 | Cama et al. | |
| 2019/0318370 | A1* | 10/2019 | Kopikare | G06Q 30/0282 |
| 2020/0202369 | A1* | 6/2020 | Datta | G06V 40/176 |
| 2020/0342472 | A1* | 10/2020 | Coffman | G06Q 30/0203 |
| 2021/0110415 | A1 | 4/2021 | Deshmukh et al. | |
| 2023/0091249 | A1* | 3/2023 | Reynolds | G10L 15/26 |
| | | | | 705/26.35 |

OTHER PUBLICATIONS

V. Satyanarayana, S. Shankar, V. Sruthi and B. Das, "A Study of Artificial Social Intelligence in Conversational Agents," 2018 3rd International Conference on Inventive Computation Technologies (ICICT), 2018, pp. 545-550, doi: 10.1109/ICICT43934.2018. 9034313. (Year: 2018).*

S. K. Pandey, H. S. Shekhawat and S. R. M. Prasanna, "Deep Learning Techniques for Speech Emotion Recognition: A Review," 2019 29th International Conference Radioelektronika (RADIOELEKTRONIKA), 2019, pp. 1-6, doi: 10.1109/RADIOELEK. 2019.8733432. (Year: 2019).*

Ping Wang, Yan Li, and Chandan k. Reddy. 2019. Machine Learning for Survival Analysis: A Survey. ACM Comput. Surv. 51, 6, Article 110 (Feb. 2019), 36 pages. https://doi.org/10.1145/3214306 (Year: 2019).*

Ping Wang, Yan Li, and Chandan k. Reddy. 2019. Machine Learning for Survival Analysis: A Survey. ACM Comput. Surv. 51, 6, Article 110 (Feb. 2019), 36 pages. https://doi.org/10.1145/3214306 (Year: 2019) (Year: 2019).*

A.-A. Cordos, C. Drugan and S. D. Bolboacă, "Social media and health-related information: Surveys development and validation," 2017 E-Health and Bioengineering Conference (EHB), Sinaia, Romania, 2017, pp. 61-64, doi: 10.1109/EHB.2017.7995361. (Year: 2017) (Year: 2017).*

T. Dholpuria, Y. K. Rana and C. Agrawal, "A Sentiment analysis approach through deep learning for a movie review," 2018 8th International Conference on Communication Systems and Network Technologies (CSNT), 2018, pp. 173-181, doi: 10.1109/CSNT.2018. 8820260 (Year: 2018).*

IBM: List of IBM Patents or Patent Application Treated as Related, 2 pg.

Deshmukh, A. et al., "Enhanced Survey Information Synthesis", U.S Appl. No. 17/129,916, filed Dec. 22, 2020, 39 pages (A copy is not provided as this application is available to the Examiner.).

Golbeck, J. et al., "Predicting Personality With Social Media," In CHI'11 Extended Abstracts on Human Factors in Computing Systems, ACM, May 7, 2011, pp. 253-262.

Mell, P. et al., The NIST Definition of Cloud Computing, National Institute of Standards and Technology, U.S. Dept. of Commerce, Special Publication 800-145, Sep. 2011, 7 pg.

Pandey, S.K. et al., "Deep Learning Techniques for Speech Emotion Recognition: A Review," in 2019 29th Int'l. Conf. Radioelektronika (Radioelectronika), 2019, pp. 1-6, doi: 10.1109/RADIOELEK.2019. 8733432. (Year 2019).

Dholpuria, T. et al., "A Sentiment analysis approach through deep learning for a movie review," 2018 8th Int'l Conf. on Communication Systems and Network Technologies (CSNT), 2018, pp. 173-181.

Cordos, A.A. et al.,"Social media and health-related information: Surveys development and validation," In2017 E-Health and Bioengineering Conference (EHB), Jun. 22, 2017, pp. 61-64, IEEE.

* cited by examiner

ENHANCED SURVEY INFORMATION SYNTHESIS

BACKGROUND

This disclosure relates to electronic data processing, and more particularly, to processing electronic survey data.

Surveys are widely used by researchers in a broad range of fields, including academia, business, government, and a host of others. Surveys are an efficient way—at times, the only way—to elicit certain types of information from specific groups on behalf of advertisers, psychologists, political candidates, public officials, marketers, sociologists, and many others. Typically comprising a list of questions, a survey can take various forms (e.g., census, opinion poll, household survey) and can be conducted in myriad ways. Surveys have long been conducted in one-on-one interviews, by phone, and via mail. More recently, surveys are conducted on-line via data communication networks and the Internet. Regardless of the manner in which survey data is collected, virtually all survey data is now analyzed using some form of electronic data processing.

SUMMARY

In one or more embodiments, a method includes performing, with computer hardware, a respondent assessment of a survey respondent based on respondent data obtained electronically from at least one electronic data source. The method also can include adjusting, with the computer hardware, survey responses provided by the survey respondent, wherein the adjusting is based on the respondent assessment. Additionally, the method can include generating a revised survey with the computer hardware, the revised survey comprising the survey responses adjusted based on the respondent assessment.

In one or more embodiments, a system includes a processor configured to initiate operations. The operations can include performing a respondent assessment of a survey respondent based on respondent data obtained electronically from at least one electronic data source. The operations also can include adjusting survey responses provided by the survey respondent, wherein the adjusting is based on the respondent assessment. Additionally, the operations can include generating a revised survey, the revised survey comprising the survey responses adjusted based on the respondent assessment.

In one or more embodiments, a computer program product includes a computer readable storage medium having program instructions stored thereon. The program instructions are executable by a processor to initiate operations. The operations can include performing, with the processor, a respondent assessment of a survey respondent based on respondent data obtained electronically from at least one electronic data source. The operations also can include adjusting, with the processor, survey responses provided by the survey respondent, wherein the adjusting is based on the respondent assessment. Additionally, the operations can include generating a revised survey with the processor, the revised survey comprising the survey responses adjusted based on the respondent assessment.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
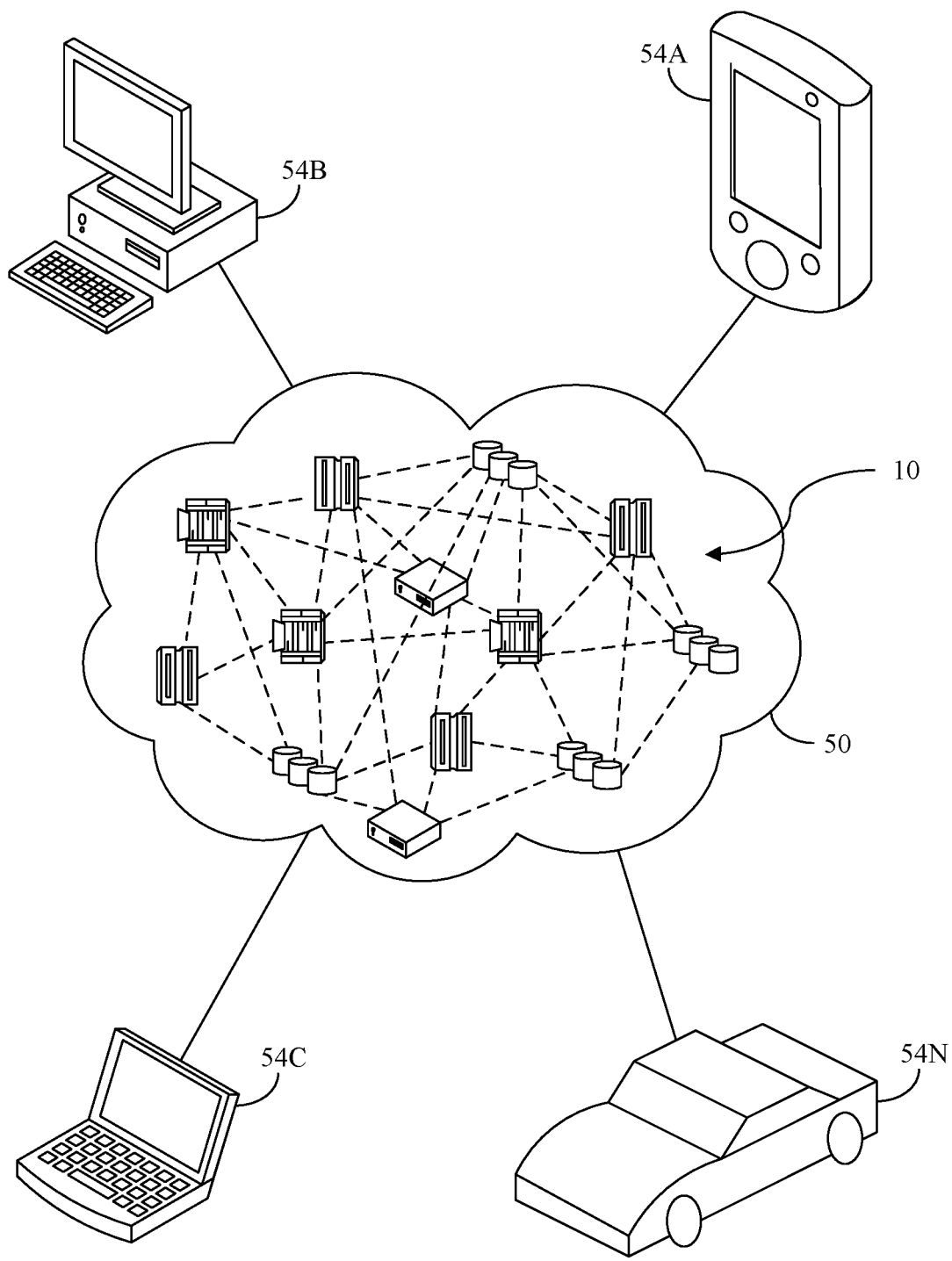
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic data processing, and more particularly, to processing electronic survey data. Notwithstanding the undeniable usefulness of survey data, the reliability of survey data can be diminished by what can be termed the "human dimension." The human dimension refers broadly to psychological, experiential, educational, emotional, or other factors, specific to a survey respondent, which can affect the reliability or usefulness of the survey respondent's answer to a given survey question.

For example, a survey respondent may be affected by an inherent subjectivity or cognitive bias that results in a perceptual distortion, inaccurate judgment, illogical interpretation, or other so-called irrationality that, though perhaps minor, nonetheless reduces the reliability of the survey respondent's answer to a survey question. For example, the survey respondent's answer to a public policy question may be affected by the survey respondent's party affiliation. Even a transitory emotional state may affect the survey respondent's answer to a survey question. For example, a survey question dealing with an issue that has very recently been the subject of news headlines may engender intense feelings that affect the survey respondent's objectivity in responding to the question. Other factors, however, may make the survey respondent's response particularly reliable, at least relative to other respondents. For example, a survey respondent's response to a question on environmental policy is likely to be especially pertinent and useful relative to others' responses if the survey respondent is an environmental scientist.

In accordance with the inventive arrangements disclosed herein, survey information is enhanced through a synthesis of survey responses and an assessment of the survey respondent who provides the responses. The methods, systems, and computer program products disclosed herein can adjust survey responses based on an assessment of the survey respondent. The respondent assessment can be based on various factors. The factors can include attitudinal, behavioral, and psychological factors. The factors can include experiential and educational factors. That is, experiences, expertise, and/or education relevant to a survey topic that make a survey respondent's response especially useful and/or reliable. Such factors used for performing a respondent assessment can be obtained from various electronic data sources, especially networked data sources such as websites and social networking sites. Thus, the data sources can include various media, social feeds, interactive voice response (IVR) systems, on-line chats, and other publicly accessible data sources maintained by the survey respondent or by one or more entities (e.g., professional organizations, commercial enterprises, non-profit entities) with which the survey respondent is affiliated.

The respondent assessment can map the various respondent-specific factors to survey question responses provided by the survey respondent. The mapping can, for example, assign weights to the survey respondent's answers to survey questions, the weights either reducing or enhancing the effect that specific survey respondent's answers have on the overall results of a survey. For example, the weights can reflect the expertise and/or experiences of the survey respondent, as well as attitudes, behaviors, and personality traits. A respondent assessment can be performed for each survey respondent, and the corresponding mapping of respondent-specific factors to the survey respondents' answers can enhance the reliability of the survey.

Another aspect of the embodiments disclosed herein is enhancement of the functioning of a data processing system itself, when the system used to collect and analyze survey data. The data processing system's enhanced efficiency can be enhanced by limiting the survey questions posed to only those specific to the topic of the survey, thus avoiding an elaborate set of questions specific to or about the particular survey respondent. Instead of having to elicit an extensive list of respondent-specific questions for processing, the data necessary for performing the respondent assessment can be obtained by the data processing system directly from other sites (e.g., social networking site).

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
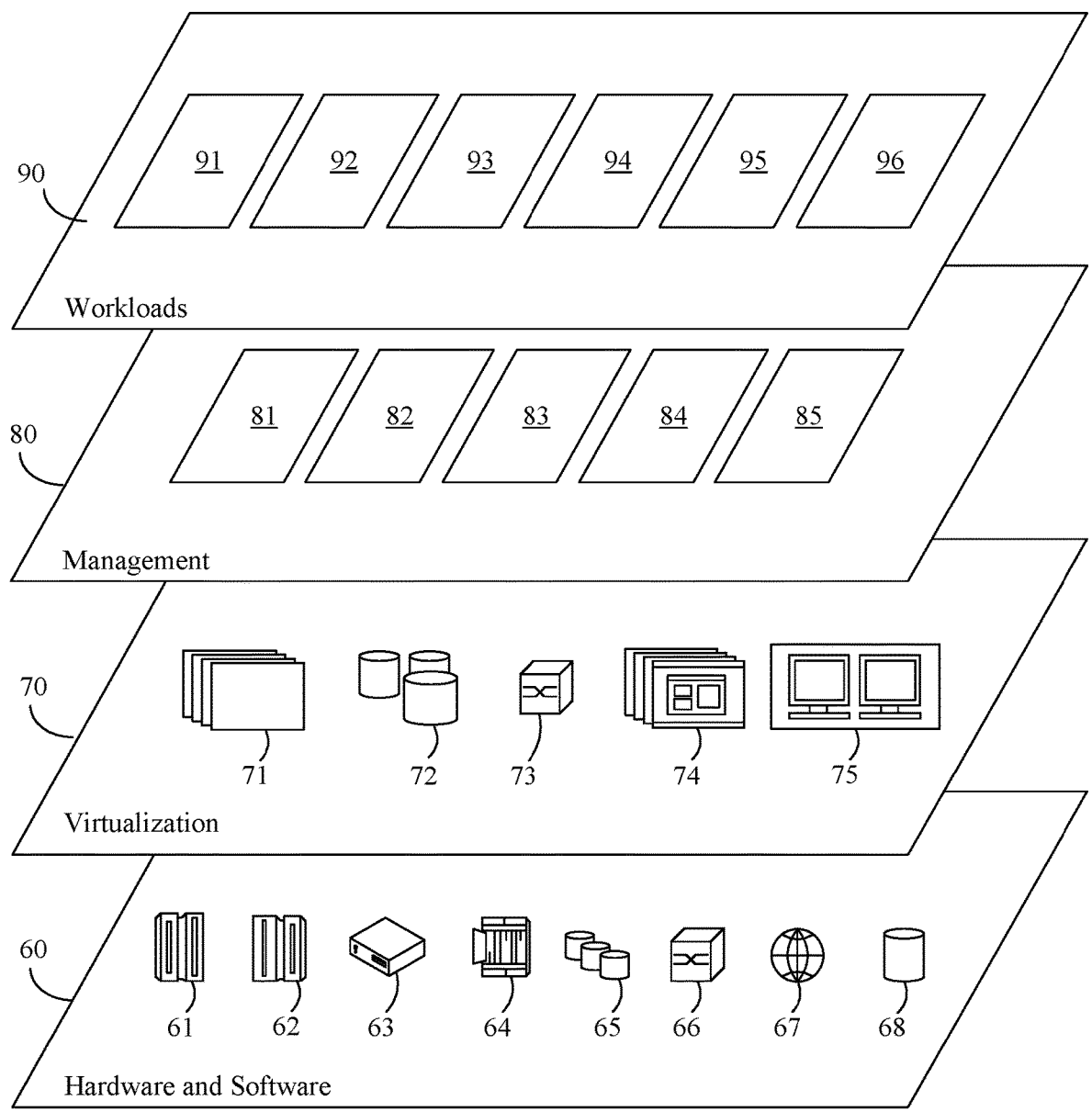
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for enhanced survey information synthesis 96.

In one or more embodiments, the system for enhanced survey information synthesis 96 is capable of performing a respondent assessment of a survey respondent who responds to a survey by answering one or more survey questions. The respondent assessment can be based on respondent-specific data that can include data related to a survey respondent's experiences relevant to a survey topic, data regarding the survey respondent's education level, data concerning the survey respondent's attitudes regarding subject matter relevant to the survey topic. Respondent data can include social activities of the survey respondent. Respondent data can indicate respondent-specific factors such as personality traits, and/or behavioral attributes.

The system for enhanced survey information synthesis 96 is capable of obtaining the respondent data electronically from one or more electronic data sources. The electronic data sources can be networked data sources, that is, sources that are communicatively coupled to an electronic data network (e.g., local area network or wide area network) or the Internet. Such sources thus can include websites (e.g., business, professional, and other organization websites), social networking sites, and other networked electronic data sources.

The system for enhanced survey information synthesis 96 is capable of adjusting survey responses provided by the survey respondent based on the respondent assessment. The respondent assessment can be performed using a classification model. The classification model can be constructed using machine learning. The classification model, for example, can be a deep learning neural network. The respondent assessment can be based on other models constructed using machine learning. The other machine learning models can be supervised or unsupervised learning models. For example, the machine learning model can be based on the k-nearest neighbors, using different distance metrics. In other embodiments, the respondent assessment can alternatively, or additionally, comprise determining an emotional tone based on the survey responses of the survey respondent.

The system can generate a revised survey that comprises the survey responses adjusted based on the respondent assessment. The adjusted survey responses are adjusted according to an assessment of the survey respondents. Accordingly, the adjusted survey responses are statistically more reliable and/or more useful. Further features of the system for enhanced survey information synthesis 96 are described below in greater detail.

Figure 3:
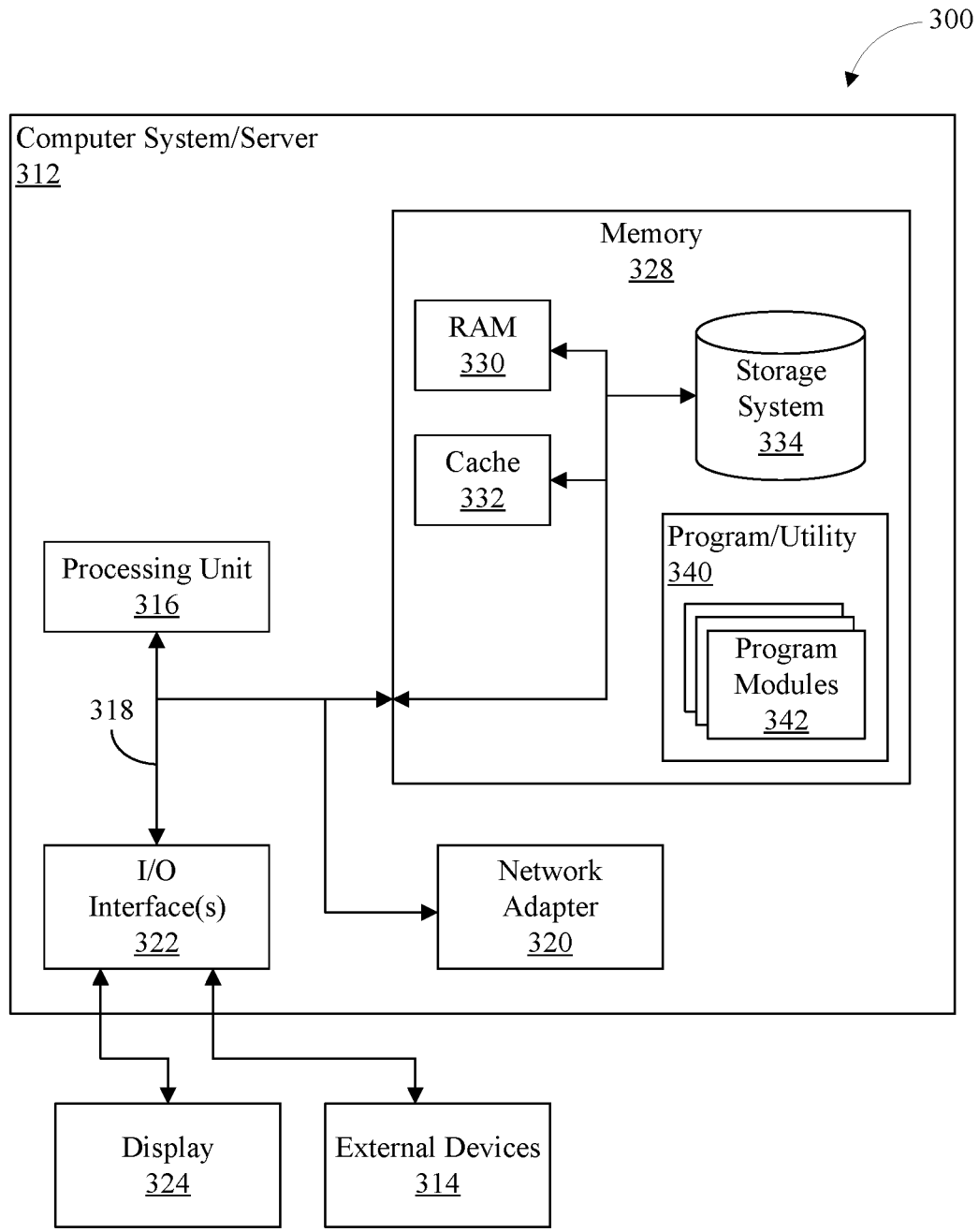
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include a system for enhanced survey information synthesis 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
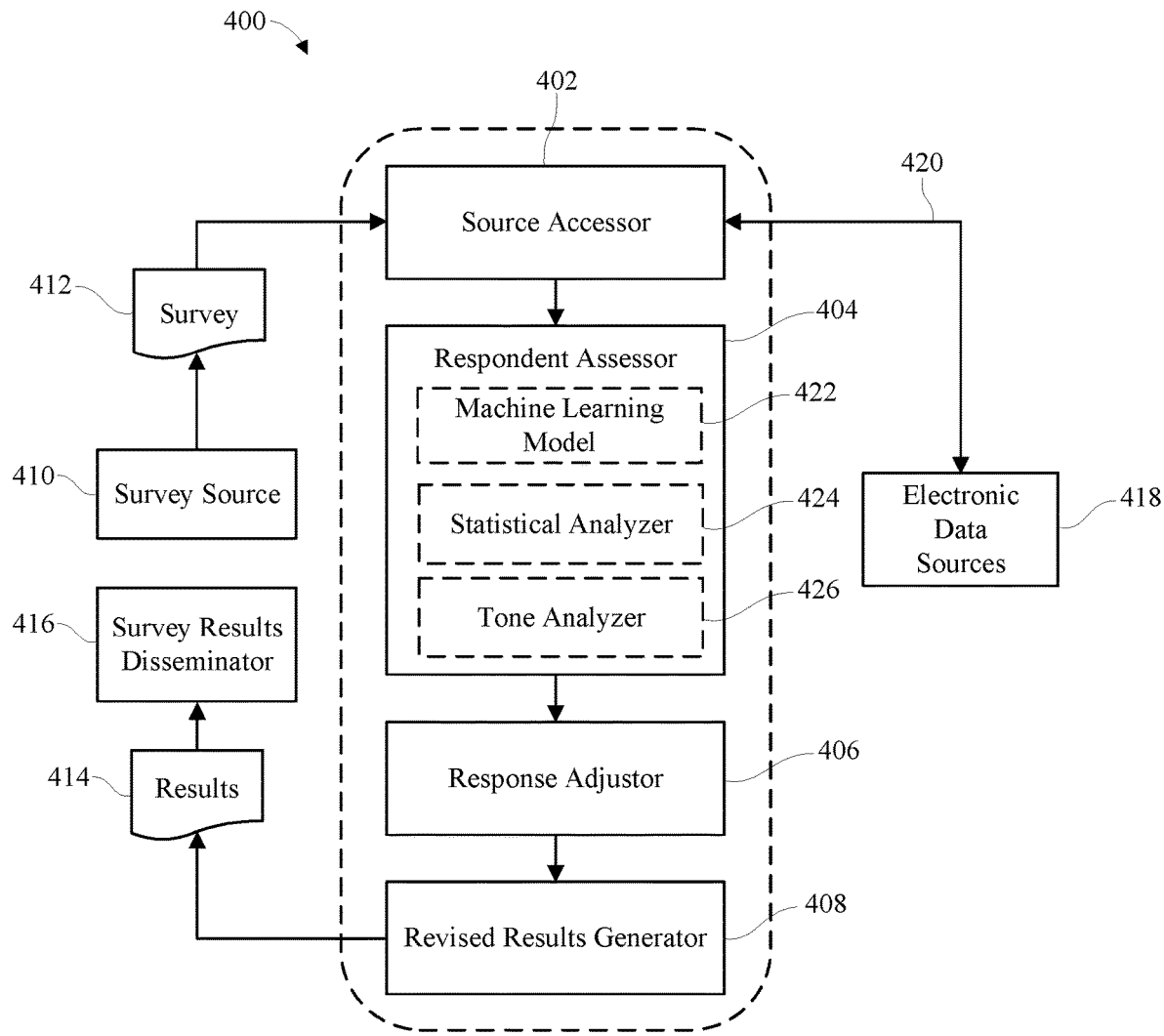
FIG. 4 depicts a system for enhanced survey information synthesis according to an embodiment of the invention.

FIG. 4 depicts one embodiment of system 400, which is similar to system for enhanced survey information synthesis 96 described in reference to FIG. 2. System 400 illustratively includes source accessor 402, respondent assessor 404, response adjustor 406, and revised results generator 408 operatively coupled together. As described more fully below, for each survey respondent who responds to a survey by answering one or more survey questions, respondent assessor 404 performs a respondent assessment. A respondent assessment assesses selected attributes (e.g., experience, education, attitudes, personality traits, behavioral attributes) of a survey respondent. The respondent assessment is based on respondent data obtained electronically by source accessor 402 from one or more electronic data sources (e.g., social networking site), including networked data sources. Response adjustor 406 adjusts survey responses provided by each survey respondent, the adjusting based on the response assessment performed by respondent assessor 404 for each survey respondent. A revised survey is generated by revised results generator 408. The revised survey comprises the survey responses adjusted based on the respondent assessments of each of the survey respondents.

In one embodiment, system 400 is implemented in computer system-executable instructions (e.g., one or more program modules) that are executable by a processor such as processor 316 of computer system 312 described in reference to FIG. 3. Accordingly, system 400 can be implemented, for example, in computer-system instructions executable on a server (e.g., cloud-based server) or other type of computer system. In other embodiments, one or more of source accessor 402, respondent assessor 404, response adjustor 406, and revised results generator 408 can be implemented in hardwired circuitry or in a combination of hardwired circuitry and computer system-executable instructions.

System 400 can be integrated in or communicatively coupled with one or more survey sources, illustrated by survey source 410 in FIG. 4. Survey source 410 can disseminate surveys, collect survey responses, and generate electronic survey data 412 that is conveyed to system 400. Survey source 410 can be any type of system for disseminating, collecting, and collating survey data. For example, survey source 410 can be a publicly accessible kiosk for use by survey respondents. Survey source 410, for example, can be a networked computing node or system that conducts on-line surveys. Survey source 410 can comprise a speech-to-text engine (not shown) for converting verbal responses collected through phone interviews into electronic survey data 412, for example. Survey source 410, for example, can comprise an optical character reader (not shown) for converting mail-in survey responses or other pen-and-paper responses (e.g., based on in-person interviews) into electronic survey data 412. Survey source 410, for example, can be a wearable device or an Internet-of-Things (IOT) device via which survey respondents can convey electronic survey data 412 that is provided to system 400.

Revised survey results generated by revised results generator 408 can be conveyed as electronic survey data results 414 to survey results disseminator 416. Survey results disseminator 416 can also be a computing node or system, which can be integrated with or communicatively coupled to survey source 410 and which can convey revised survey results to one or more survey users. Revised survey results are survey results that are adjusted based on the respondent assessments performed by respondent assessor 404 for each of the survey's respondents.

Respondent assessments are performed by respondent assessor 404 based on respondent-specific data such as data concerning a survey respondent's experiences (experiential data) relevant to a survey topic, education level or other educational data, expressed attitudes, personality traits, and/or behavioral attributes. Respondent-specific data can be provided by a survey respondent himself or herself directly along with answers to questions relating to the survey topic. For example, respondent-specific data can be determined based on a survey respondent's answers to a test such as the Myers-Briggs Type Indicator (MBTI) or Process Communication Model (PCM). Alternatively, or additionally, respondent-specific data that is not provided by the survey respondent himself or herself, but is nonetheless relevant for performing a respondent assessment can be obtained by source accessor 402 from various electronic data sources 418, including networked data sources such as social networking sites and other on-line data sources that are communicatively coupled with system 400 via one or more data communication networks illustrated by data communications network 420. For example, various techniques can be incorporated into respondent assessor 404 to predict personality traits based on public information that survey respondents provide on social media. Techniques based on Open-Vocabulary Analysis can be applied to a survey respondent's comments and chats on social media, for example. Open-Vocabulary Analysis analyzes words shown to be predictive of personality traits and can be used in lieu of or in addition to other survey questions (e.g., MBTI or PCM questions) addressed directly to the survey respondent. Other techniques incorporated into respondent assessor for predicting personality traits include, for example, machine learning algorithms (e.g., Gaussian Processes) that have been shown to predict certain personality traits with relatively high accuracy using public information that survey respondents provide on social networking sites and other on-line data sources.

As described in greater detail below, such electronic data sources accessed by source accessor 402 can be a source for on-line chats, comments, descriptions of experiences and/or education, expressions of attitudes, and the like all related to a specific survey respondent. In one embodiment, also described in greater detail below, such respondent-specific information can provide inputs to various machine learning models that, in certain embodiments, can be incorporated in respondent assessor 404 for performing respondent assessments that, in part, classify a survey respondent. Response adjustor 406 can adjust the survey respondent's responses to survey questions by adjusting the responses (e.g., weighting the responses) based on the classification.

Data communications network 420 can provide communication links between various devices and data processing systems. The communication links can include connections, such as wired communication links, wireless communication links, or fiber optic cables, and can be implemented as, or include, one or more (or any combination of) different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, a Public Switched Telephone Network (PSTN), and so forth. Devices capable of coupling to data communications network 420 via wired and/or wireless communication links can include personal computers, portable computing or communication devices, network computers, tablet computers, mobile phones, or the like.

As defined herein, the term "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system. A communication link for exchanging text messages is considered a distinct communication link. Likewise, a communication link for exchanging emails is a distinct communication, as is a communication link for video calls, as is a communication link for voice calls. So, too, a communication link used for posting to social networking systems is considered a distinct communication link. That is, each type of communication link corresponding to a different type or mode of communication is considered a distinct communication link.

Over one or more such communication links, source accessor 402 can access one or more electronic data sources 418 to obtain respondent data used by respondent assessor 404 for performing a respondent assessment of a survey respondent. In certain instances, a survey respondent can indicate one or more electronic data sources 418. Alternatively, or additionally, source accessor can identify one or more electronic data sources 418 that provides respondent-specific information and that is made publicly available or accessible by the permission of a survey respondent (e.g., a survey respondent's website or social networking site). A business or other organization's website that includes information regarding a particular expertise of the survey respondent, for example, can be among the one or more electronic data sources 418. Among the one or more electronic data sources 418 can be a professional organization (e.g., medical association), for example, which includes information regarding the education and/or experience of the survey respondent. Electronic data sources 418 can include various other networked sites that can be identified with a survey respondent based on publicly available information and that can provide educational, experiential, and/or attitudinal data regarding the survey respondent.

Social networking systems can also be among electronic data sources 418. Thus, respondent-specific data can be obtained by source accessor 402 from exchanges involving the survey respondent over one or more such social networking systems. A social networking system can be implemented as one or more interconnected computer systems, e.g., servers. As defined herein, a "social networking system" is a computing platform that allows users to build social networks or social relations with other users who share similar interests, activities, backgrounds, and/or real-life connections. Through a social networking system, users can send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking system, actions such as posting, replying, liking, sharing, expressing sentiment, and so forth are programmatic actions that are monitored and persisted within the social networking system, such as in a data structure within a data storage device within and/or accessible by the social networking system.

Accordingly, source accessor 402 can obtain respondent-specific data from one or more social networking systems. Respondent assessor 404 can perform a respondent assessment based on the survey respondent's experiences, interests, activities, attitudes, and other information that shared by the survey respondent the one or more social networking systems. Respondent assessor 404 can perform a respondent assessment, for example, based on a survey respondent's communications through different mechanisms, such as by posting messages or other media, commenting on messages, posts, or other media, replying to messages, and performing other operations such as "liking" a communication or item of media, sharing the communication or item of media, expressing an emotional sentiment, and so forth.

Respondent assessor 404 can apply different techniques to the same types of respondent-specific information for performing a personality assessment (e.g., intuition, thinking, sensations, feelings) of a survey respondent, for example. A personality assessment made by respondent assessor 404 can be based on data obtained by source accessor 402, including social comments, on-line conversations, social activities, experiences with specific subject matter, geography, and other factors.

The respondent assessment performed by respondent assessor 404 is used by response adjustor 406 to adjust the survey respondent's answers to survey questions. Adjusting by response adjustor 406 can comprise multiplying a survey response (e.g., score based on a rating scale) by a predetermined weight (e.g., a real number). The weight applied to a survey response value can be a value computed based on one or more respondent-specific factors derived from the various types of respondent-specific information described above. The factors can include, for example, behavioral attributes or personality traits of a survey respondent, the emotional tone of the survey respondent's responses to survey questions, experience of the survey respondent with respect to a survey topic, expertise of the survey respondent with respect to the survey topic, education level of the survey respondent, and/or other factors relevant to the survey topic.

A weight determined by response adjustor 406 can be a composite value. For example, if a respondent assessment of a survey respondent determines that the survey respondent has considerable education or experience relevant to a survey topic, then absent any other consideration, a weight greater than one (e.g., 1.5) can apply to the survey respondent's answers on that topic. If, however, a tone analysis indicates, for example, that the same survey respondent exhibits anger or tentativeness (e.g., reluctance to answer), then a weight less than one can apply (e.g., 0.5). An average or other formula can be used by response adjustor 406 to determine a composite value (e.g., (1.5+0.5)/2=1.0) of the weight applied to the particular question.

Various other statistical formulas and calculations can be used by response adjustor 406 for adjusting survey results based on respondent assessments of survey respondents. One calculation that can be used by response adjustor 406 comprises adding predetermined weights to a survey respondent's answers to a question based on the survey respondent's experience. Greater weight is afforded the responses of survey respondents having greater experience with respect to a survey topic on the assumption that survey respondents who have greater experience provide correspondingly more meaningful statistical data.

For example, in a survey conducted among employees of an organization, a survey question may ask an employee's opinion about the organization. The survey can use a rating scale (e.g., Likert scale) for ranking the survey respondent's attitude to a survey statement, such as 1 for "strongly disagree," 2 for "disagree," 3 for "neutral," 4 for "agree," and 5 for "strongly agree." Table 1, below, is an example of results obtained on a survey question from 14 survey respondents. Each response is counted as "one" if the respondent's survey response is a 4 or a 5 ("agrees" or "strongly agrees," respectively, with a favorable statement about the organization); and otherwise is counted as "zero" if the respondent's survey response is a 1, 2, or 3 ("disagrees," "strongly agrees," or is "neutral," respectively, with a favorable statement about the organization). The summation of ones and zeros (raw count) determines the number of favorable views.

The results are adjusted by response adjustor 406 based on the following weights corresponding to a survey respondent's years of experience with the organization:

| | | |
|---|---|---|
| Over 10 years | count = 0 or 1 | weight = 1.8; |
| 5 to 10 years | count = 0 or 1 | weight = 1.6; |
| 2 to 4 years | count = 0 or 1 | weight = 1.4; |
| 1 to 3 years | count = 0 or 1 | weight = 1.2; and |
| Less than 1 year | count = 0 or 1 | weight = 1.0. |

The percentage favorable (percentage of respondents who selected either 4 or 5 on the rating scale) is 43% using the raw count of zeros and ones. When the survey responses are adjusted according to respondents' years of experience using the predetermined weights, revised results generator 408 determines that the percent of favorable responses increases 12 basis points.

TABLE 1

| Experience | Scale Selection | Count of Favorable Responses (4 or 5) | Count times Weight |
|---|---|---|---|
| 1 to 3 years | 2 | 0 | 0 |
| 1 to 3 years | 1 | 0 | 0 |

TABLE 1-continued

| Experience | Scale Selection | Count of Favorable Responses (4 or 5) | Count times Weight |
|---|---|---|---|
| 2 to 4 years | 4 | 1 | 1.4 |
| 2 to 4 years | 5 | 1 | 1.4 |
| 5 to 10 years | 4 | 1 | 1.6 |
| 5 to 10 years | 4 | 1 | 1.6 |
| Less than 1 year | 1 | 0 | 0 |
| Less than 1 year | 2 | 0 | 0 |
| Less than 1 year | 2 | 0 | 0 |
| Less than 1 year | 1 | 0 | 0 |
| Less than 1 year | 1 | 0 | 0 |
| Less than 1 year | 2 | 0 | 0 |
| over 10 | 4 | 1 | 1.8 |
| over 10 | 5 | 1 | 1.8 |
| Count | | 14 | 17.6 |
| Total | | 6 | 9.6 |
| % Favorable | | 43% | 55% |

Respondent assessor 404 optionally can include machine learning model 422. Machine learning model 422 can be a classification or regression model that is trained using supervised or unsupervised learning. Machine learning model 422 in one embodiment can be a deep learning neural network for classifying survey respondents based on respondent-specific factors (e.g., education, experience, behavioral attributes, personality traits). Using a deep learning neural network, respondent assessor 404 can classify a survey respondent into one of n-classes. A weight vector $w_i$, or m-tuple (assuming a survey comprising m questions), drawn from a set of weight vectors (each weight vector corresponding to one of the n-classes) can be applied to a survey respondent's answers to survey questions, the specific m-dimensional weight vector selected based on which of the n-classes the survey respondent is assigned by the deep learning neural network.

Figure 5:
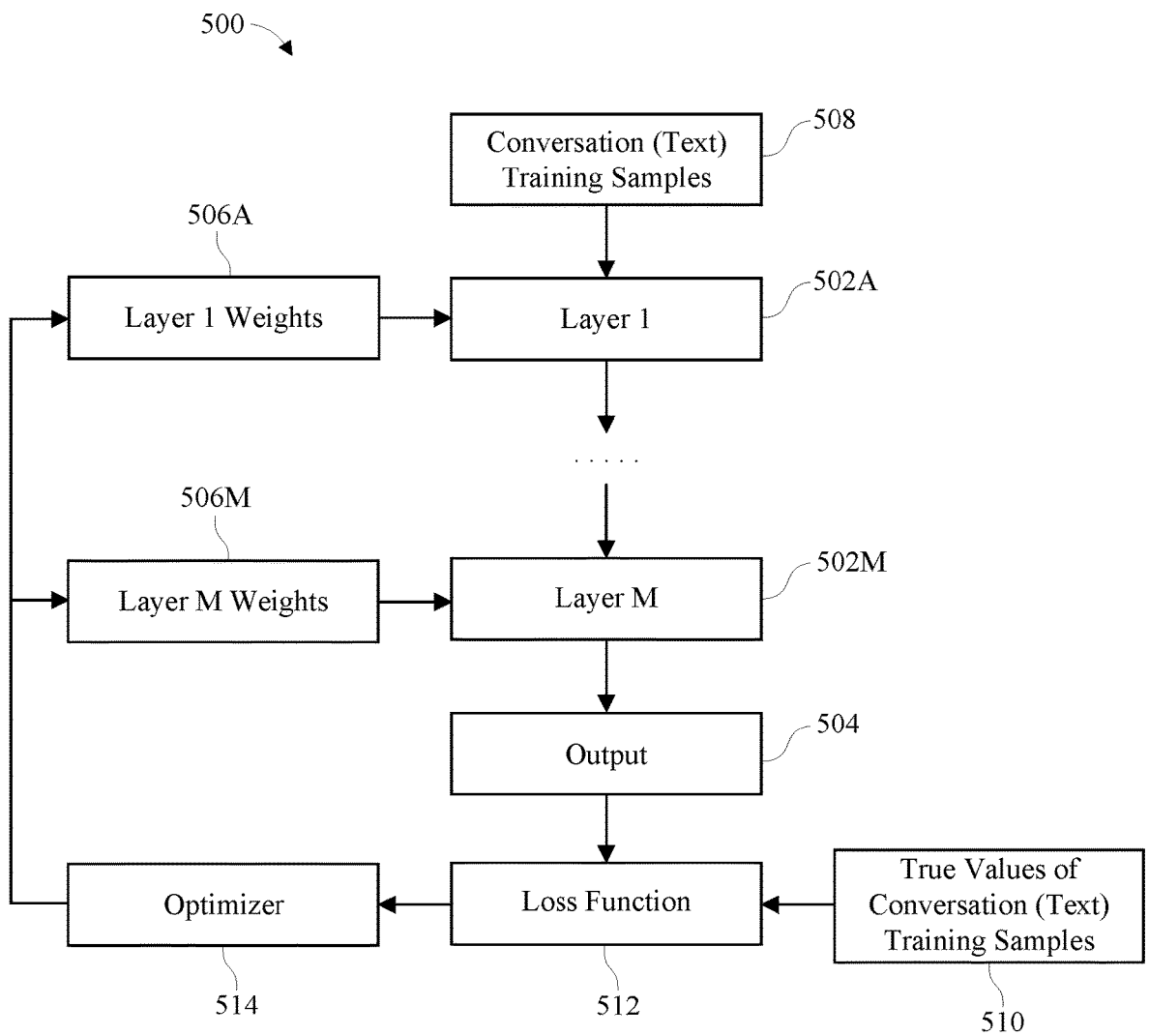
FIG. 5 depicts an example neural network used in a system for enhanced survey information synthesis according to an embodiment of the invention.

Referring additionally to FIG. 5, neural network 500 illustrates an example machine learning model comprising a neural network for classifying a survey respondent. Input to neural network 500 can be in the form of feature vectors, each feature vector corresponding to a specific survey respondent. Each element of a feature vector corresponds to an attribute of the corresponding survey respondent. For example, one element may take on a value of zero or one, depending on whether the survey respondent exhibits a particular characteristic (e.g., personality trait) as determined by a respondent assessment of the survey respondent. Another feature vector element, for example, can be a positive number representing the survey respondent's years of experience with respect to a survey topic. Another feature vector element can indicate the survey respondent's level of education, for example.

Moreover, elements of feature vectors can be based on social networking chats, on-line comments, expressions of attitudes and opinions gleaned from social networking and other on-line messaging. The features can provide useful indicia for classifying a survey respondent as part of a respondent assessment. Because such features, initially, are in the form of text, the text can be transformed into numerical tensors (multidimensional algebraic objects or one-dimensional vectors) by breaking the text (e.g., words, characters, n-grams) into tokens and associating numeric vectors with each. A technique such as categorical encoding (one-hot encoding) or word embedding can be used to transform text into numerical tensors that can input into neural network 500.

Neural network 500 is illustratively a deep learning neural network comprising a directed, acyclic graph of layers (text processing modules or filters) 502A through 502M sequentially chained together. Output 504 generated by neural network 500 is based on an input vector (feature vector) that feeds through layers 502A through 502M, each layer modifying the output of a preceding layer based on a set of parameters (or classification weights) 506A through 506M. The parameters or classification weights (kernel and bias attributes) are trained (iteratively refined) using training samples fed into the neural network. The output generated is compared with true values (correctly labeled survey respondent classifications) 510 of the training samples 508. The difference between the generated values and true values 510 for classifying the training samples 508 can be measured by a loss, which is calculated by loss function 512. In one embodiment, loss function 512 is the categorical cross-entropy criterion. In a feedback fashion, optimizer 514 adjusts weights 506A through 506M over successive iterations using the backpropagation algorithm. The backpropagation algorithm iteratively adjusts weights 506A through 506M in directions that lower the loss calculated by loss function 512. The iterative refinement of weights 506A through 506M continues until an acceptable level of accuracy is achieved in classifying a separate test set of survey respondent samples.

Once trained, neural network 500 classifies a survey respondent feature vector by outputting a vector whose elements are a probability (between zero and one) that the survey respondent represented by the feature vector belongs to a specific category or class. The survey respondent is classified as belonging to the category for which the probability is greatest and, depending on the classification, response adjustor 406 applies a corresponding set of weights to each survey response provided by the model-classified survey respondent.

In another embodiment, machine learning model 422 can be an unsupervised learning model that groups survey respondents into distinct groups based on model-identified similarities among of the survey respondents. For example, machine learning model 422 can be constructed based on the k-nearest neighbors, a non-parametric learning algorithm. Survey respondents can be grouped based on a closeness of the survey respondents' corresponding feature vectors, the elements of which are the attributes or respondent-specific factors (e.g., education, experience, attitudes, emotion, behavioral attributes, personality traits) described above.

The closeness can be measured based on a Euclidean distance between the feature vectors (in bold):

$$d(x_i, x_j) = \sqrt{\sum_{k=1}^{n}(x_i^{(k)} - x_j^{(k)})^2},$$

where $x_i = (x_i^{(1)}, x_i^{(2)}, \ldots, x_i^{(n)})$ and $x_j = (x_j^{(1)}, x_j^{(2)}, \ldots, x_j^{(n)})$ are each n-dimensional feature vectors. An alternative metric for measuring closeness can be based on the feature vectors' cosine similarity:

$$\cos(\angle(x_i, x_j)) = \frac{\sum_{k=1}^{n} x_i^{(k)} x_j^{(k)}}{\sqrt{\sum_{k=1}^{n}(x_i^{(k)})^2} \sqrt{\sum_{k=1}^{n}(x_j^{(k)})^2}}.$$

Other distance metrics for determining closeness can be used, such as Chebychev distance, Mahalanobis, distance, and Hamming distance. The same predetermined weights can be used to adjust the survey responses of survey respondents that, based on closeness of corresponding feature vectors, are grouped together. For each distinct group of survey respondents, a particular set of weights can be applied with respect to the survey responses of those members of the same group.

In other embodiments, respondent assessor 404 can include still other types of machine learning models for performing the respondent assessments that are based on respondent-specific factors (e.g., education, experiences, attitudes, personality traits, behavioral attributes) and that are the basis for adjusting survey responses provided by the survey respondents. Alternatively, or additionally, respondent assessor 404 optionally can include statistical analyzer 424 for determining appropriate weights based on different types of statistical analyses (e.g., linear regression, ordinary least squares regression, nonparametric regression) of the respondent-specific factors (e.g., education, experiences, attitudes, personality traits, behavioral attributes). Based on machine learning classification and/or statistical analysis, respondent assessor 404 can determine an average, or normalized score, based on which the response adjustor 406 can weight each response given by each survey respondent based on a corresponding respondent assessment derived from respondent-specific factors or attributes.

In still other embodiments, respondent assessor 404 optionally can additionally, or alternatively, include tone analyzer 426. Tone analyzer 426 can analyze a survey respondent's responses (written or textual renderings of verbal responses) using linguistic analysis to determine the survey respondent's tone (e.g., frustrated, fearful, sad, satisfied, excited, polite, impolite, sympathetic, angry, analytical) at the sentence level. A machine learning model can train tone analyzer 426 to predict tones based on several categories of features including n-gram features, lexical features from different dictionaries, punctuation, and second-person references. The machine learning model, in one embodiment, can comprise a Support Vector Machine (SVM).

Tone analyzer 426, in another embodiment, optionally can incorporate capabilities for ascertaining a survey respondent's emotion or tone from the survey respondent's voice-recorded answers to survey questions. In accordance with the embodiment, tone analyzer 426 can combine speech-to-text technology with a tone analyzer that measures the survey respondent's emotion based on speech output, either in real-time or based on recorded speech. Accordingly, coupling system 400 with a voice response system, tone analyzer 426 can perform tone analysis on voice responses to survey questions.

A survey respondent's tone can be an adjunct to, or an alternative for, other respondent-specific attributes or factors used for performing a respondent assessment that is the basis for adjusting survey responses provided by the survey respondent. For example, a survey response made by a survey respondent—regardless of the survey respondent's experience, education, personality traits, or other attributes—is likely to be less reliable if made when the survey respondent is angry. Conversely, a survey response made when the same survey respondent is determined to be in an analytical frame of mind is correspondingly more likely to be reliable. A survey respondent's tone determined by tone analyzer 426 can be incorporated in or used as an alternative to other respondent-specific factors for performing a respondent assessment for the survey respondent. For example, survey responses (answers to survey questions) of a survey respondent whose tone is, for example, angry or frustrated can be given less weight that the responses otherwise would be given were the survey respondent's tone not negative.

Figure 6:
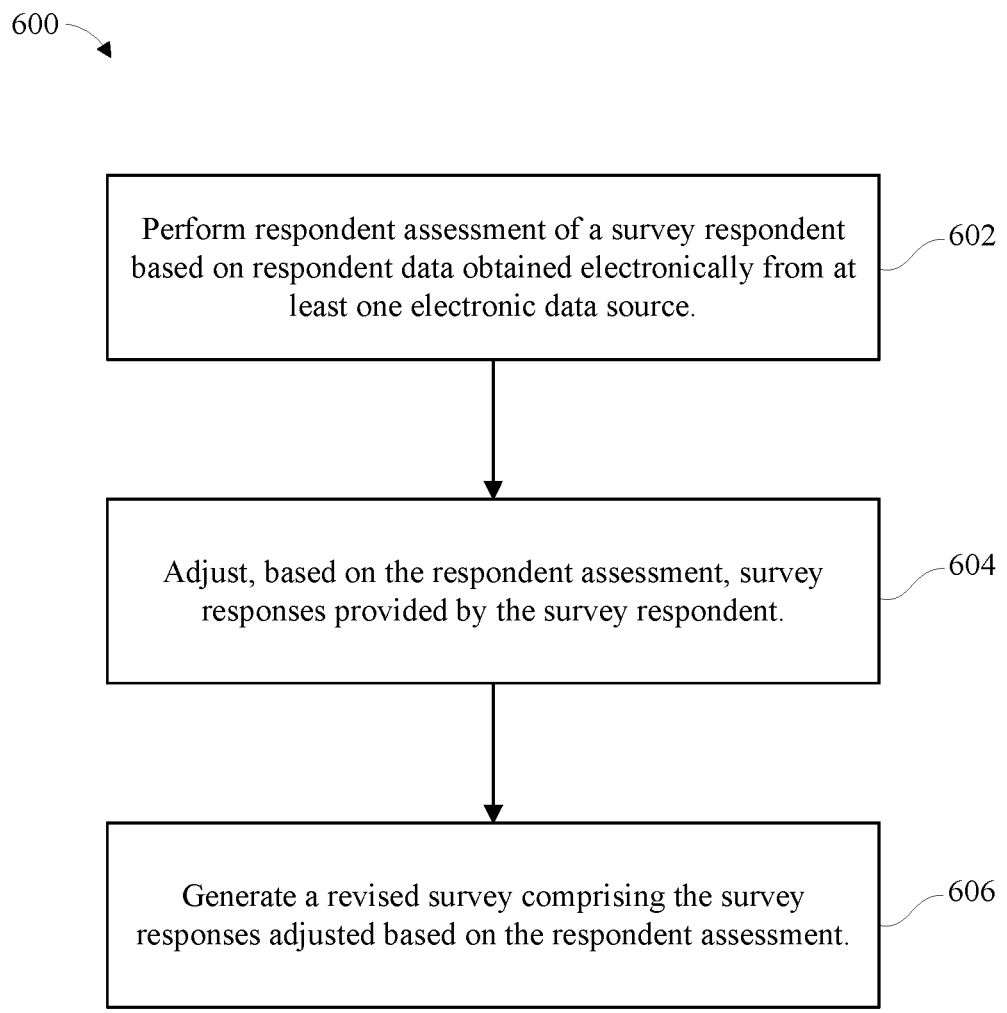
FIG. 6 is a flowchart of a method for enhanced survey information synthesis according to an embodiment of the invention.

FIG. 6 is a flowchart of method 600 for enhanced survey information synthesis, according to one embodiment. Method 600 can be performed by a system the same as or similar to the systems described in reference to FIGS. 1-5. The system at block 602 can perform a respondent assessment of a survey respondent who responds to a survey by answering one or more survey questions.

The respondent assessment can be based on respondent data. Respondent data can include data related to a survey respondent's experiences (experiential data) relevant to a survey topic, for example. Respondent data, for example, can include data regarding the survey respondent's education level or other educational data. Respondent data can concern the survey respondent's attitude regarding subject matter relevant to the survey topic. Respondent data can include social activities of the survey respondent. Respondent data can indicate respondent-specific factors such as personality traits, and/or behavioral attributes. The respondent data can be obtained by the system electronically from one or more electronic data sources, such as websites, social networking sites, and other networked electronic data sources.

At block 604, the system can adjust survey responses provided by the survey respondent. The adjusting can be based on the respondent assessment. The system, at block 606 can generate a revised survey that comprises the survey responses adjusted based on the respondent assessment.

In one embodiment, the respondent assessment can be based on a classification model. The classification model can be constructed using machine learning. The classification model, for example, can be a deep learning neural network. The respondent assessment can be based on other models constructed using machine learning. The other machine learning models can be supervised or unsupervised learning models. For example, the machine learning model can be based on the k-nearest neighbors, using different distance metrics. In other embodiments, the respondent assessment can alternatively, or additionally, comprise determining an emotional tone based on the survey responses of the survey respondent.

Any combination of attributes such as those described herein cab be used to determine whether and how to adjust a survey respondent's response to one or more survey questions. In another aspect, the responses can be based on a particular selected one or selected combination of attributes that can affect the usefulness and/or the one or more questions. Moreover, in still another aspect, particular attributes used can vary from one survey question to another in any survey.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrases "if it is determined" and "if [a stated condition or event] is detected" are to be construed to mean "in response to determining" or "in response to detecting [the stated condition or event]" or "responsive to determining" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the phrases "responsive to" and "in response to" mean responding or reacting readily to an action or event. Thus, if a second action is performed "responsive to" or "in response to" a first action, there is a causal relationship between an occurrence of the first action and an occurrence of the second action. The phrases "responsive to" and "in response to" indicate the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user" and "survey respondent" mean a human being. Accordingly, the terms "users" and "survey respondents" mean multiple human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, comprising
a computer readable hardware storage device having program instructions embodied therewith,
the program instructions, which when executed by a computer hardware system including a respondent assessor, a response adjuster assessor, a source assessor, and a revised results generator, cause the computer hardware system to perform:
   receiving, from a survey source and by the source assessor, electronic survey data corresponding to a survey including survey responses from a plurality of survey respondents;
   retrieving, for each of the plurality of survey respondents and by the source assessor, respondent data from an electronic data source separate from the computer hardware system;
   performing a respondent assessment, using a deep learning neural network within the respondent assessor, of the survey respondent based on the respondent data;
   adjusting, using a classification generated by the deep learning neural network for each of the plurality of survey respondents and by the response adjuster, the survey responses to generate adjusted survey responses; and
   generating, by the revised results generator, revised electronic survey data corresponding to a revised survey including the adjusted survey responses, wherein
the survey source is an electronic device, wherein
the deep learning neural network is configured to:
   generate an output based upon an input vector fed through a plurality of layers of the deep learning neural network, and
   adjust weights of the plurality of layers by applying a backpropagation algorithm to the output.

2. The computer program product of claim 1, wherein
the deep learning neural network is a classification model constructed using machine learning.

3. The computer program product of claim 2, wherein
the classification model is configured to classify each of the plurality of survey respondents based on one or more respondent-specific factors.

4. The computer program product of claim 1, wherein
the deep learning neural network is configured to receive, as input, a feature vector corresponding to a specific survey respondent of the plurality of survey respondents, and
each element of the feature vector corresponds to an attribute of the specific survey respondent.

5. The computer program product of claim 4, wherein
at least one element of the feature vector is based upon an electronic message posted by the specific survey respondent.

6. The computer program product of claim 1, wherein
an output of the deep learning neural network is a vector having elements indicating a probability that a specific survey respondent of the plurality of survey respondents belong to a specific classification.

7. The computer program product of claim 1, wherein
the adjusting includes weighting a particular survey response for a particular survey respondent based upon an analysis of the particular survey respondent using a tone analyzer.

8. A computer hardware system, comprising:
a hardware processor including a respondent assessor, a response adjuster assessor, a source assessor, and a revised results generator and configured to initiate the following operations:
   receiving, from a survey source and by the source assessor, electronic survey data corresponding to a survey including survey responses from a plurality of survey respondents;
   retrieving, for each of the plurality of survey respondents and by the source assessor, respondent data from an electronic data source separate from the computer hardware system;
   performing a respondent assessment, using a deep learning neural network within the respondent assessor, of the survey respondent based on the respondent data;
   adjusting, using a classification generated by the deep learning neural network for each of the plurality of survey respondents and by the response adjuster, the survey responses to generate adjusted survey responses; and
   generating, by the revised results generator, revised electronic survey data corresponding to a revised survey including the adjusted survey responses, wherein the survey source is an electronic device, wherein
the deep learning neural network is configured to:
   generate an output based upon an input vector fed through a plurality of layers of the deep learning neural network, and
   adjust weights of the plurality of layers by applying a backpropagation algorithm to the output.

9. The system of claim 8, wherein
the deep learning neural network is a classification model constructed using machine learning.

10. The system of claim 9, wherein
the classification model is configured to classify each of the plurality of survey respondents based on one or more respondent-specific factors.

11. The system of claim 8, wherein
the deep learning neural network is configured to receive, as input, a feature vector corresponding to a specific survey respondent of the plurality of survey respondents, and
each element of the feature vector corresponds to an attribute of the specific survey respondent.

12. The system of claim 11, wherein
at least one element of the feature vector is based upon an electronic message posted by the specific survey respondent.

13. The system of claim 8, wherein
an output of the deep learning neural network is a vector having elements indicating a probability that a specific survey respondent of the plurality of survey respondents belong to a specific classification.

14. The system of claim 8, wherein
the adjusting includes weighting a particular survey response for a particular survey respondent based upon an analysis of the particular survey respondent using a tone analyzer.

\* \* \* \* \*